United States Patent

[11] 3,608,643

[72] Inventors John Reginald Flood
　　　　　　　Chester;
　　　　　　　John Barr Rogerson, Mynydd-Isa, near
　　　　　　　Mold, both of England
[21] Appl. No. 797,878
[22] Filed Feb. 10, 1969
[45] Patented Sept. 28, 1971
[73] Assignee Universal Graders Limited
　　　　　　　Pentre, Queensperry, Deeside, Flintshire,
　　　　　　　Great Britain
[32] Priority Feb. 12, 1968
[33]　　　　　Great Britain
[31]　　　　　6778/68

[54] GRADING MACHINES
　　　9 Claims, 2 Drawing Figs.
[52] U.S. Cl. ..................................................... 172/200,
　　　172/289, 172/291, 172/398, 172/507, 172/780
[51] Int. Cl. ...................................................... A01b 49/02,
　　　　　　　　　　　　　　　　　　A01b 63/16, A01b 65/04

[50] Field of Search............................................ 172/395,
　　　398, 407, 413, 197, 199, 200, 780, 783, 288, 291,
　　　　　　　　　　　　　　324, 507, 286, 4.5, 289, 397

[56]　　　　　　　References Cited
　　　　　　　UNITED STATES PATENTS
2,142,985　1/1939　Arndt............................ 172/291 X
2,197,390　4/1940　Arndt............................ 172/507 X
3,376,937　4/1968　Groberg........................ 172/780
3,428,133　2/1969　Young et al. .................. 172/398 X Primary Examiner—Robert E. Pulfrey
Assistant Examiner—Stephen C. Pellegrino
Attorney—Holman & Stern ABSTRACT: A machine, particularly a grading machine, comprising a draw bar having a tool support depending therefrom through a vertical pivot to enable angling of the support, a grading blade or other tool is carried on the front of the support which has a pair of wheels attached to a beam at the rear thereof; the blade or other tool can be raised and lowered as well as angled and the wheels can be steered by an operator sitting on a seat behind the tool support.

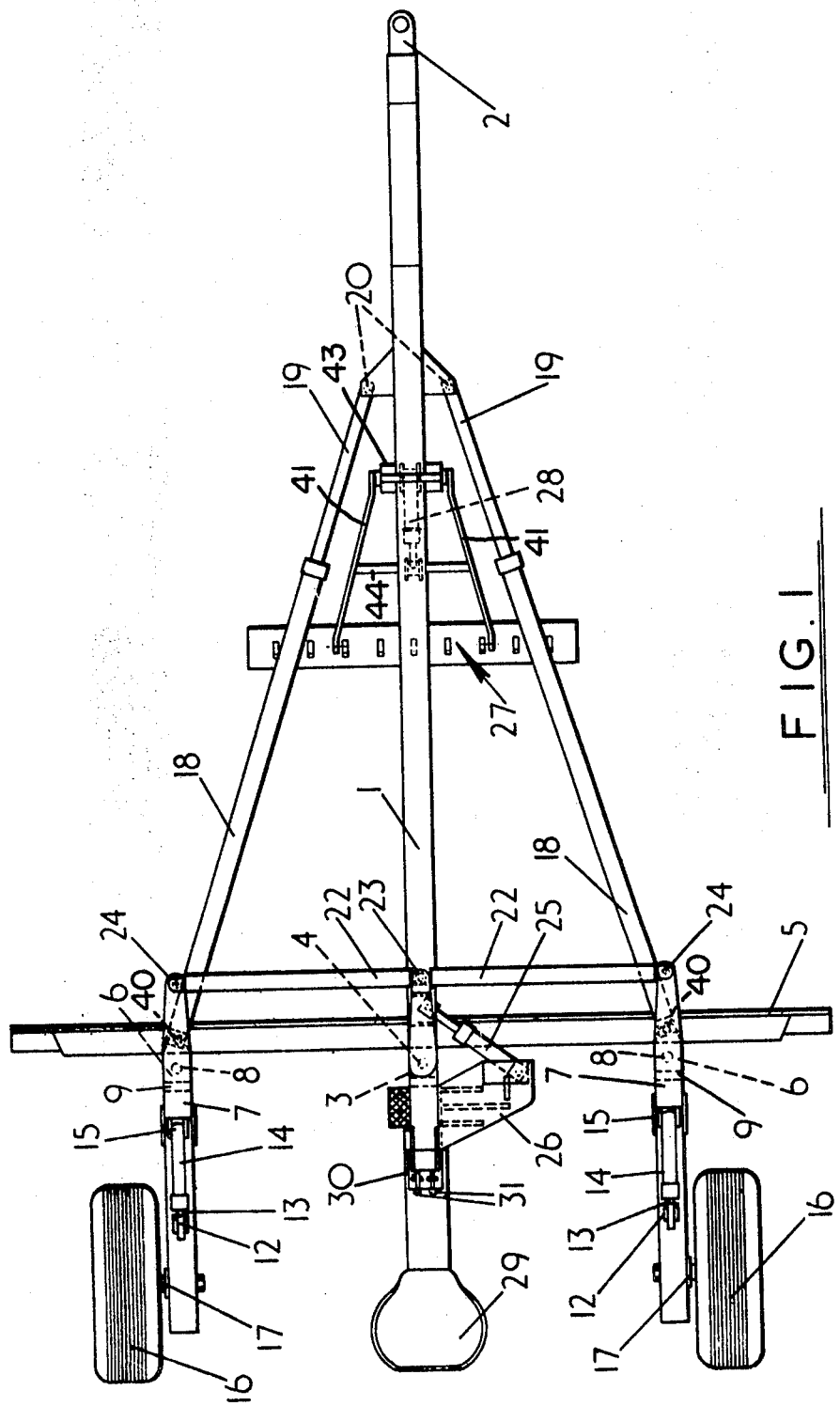

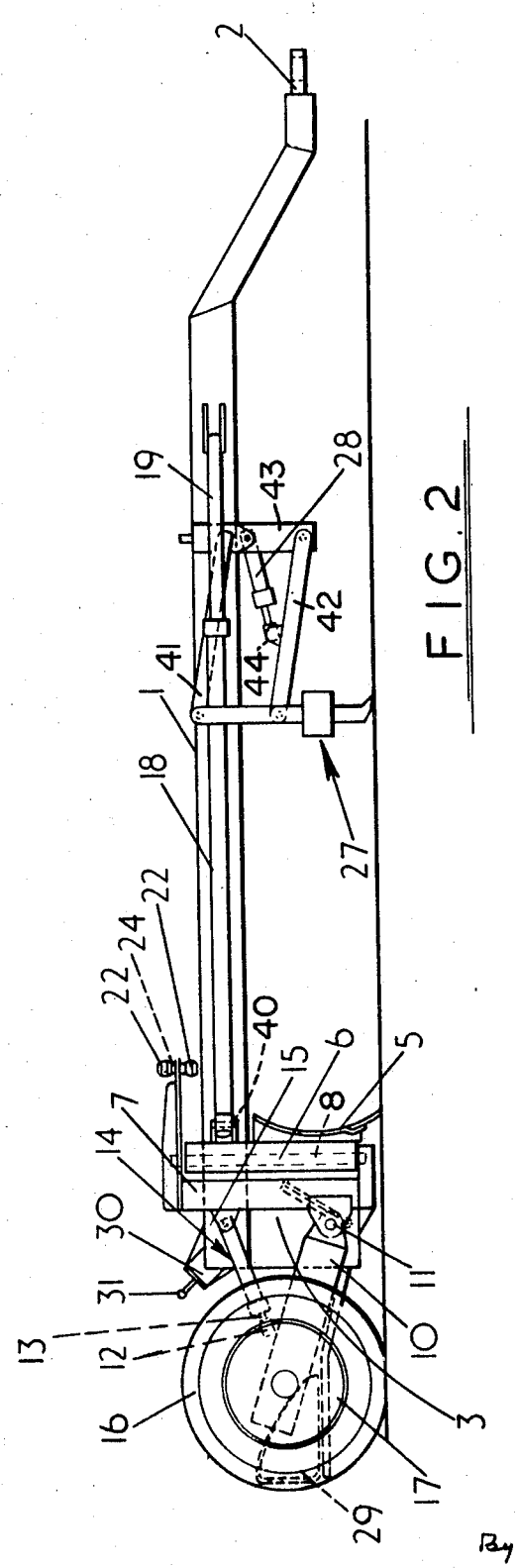

GRADING MACHINES

This invention relates to machines for ground treatment such as surface grading, agricultural ploughing, see drilling, fertilizer spreading, snow or sand, grading, cultivating, digging, and carrying, spreading and levelling earth etc.

An object of the present invention is to provide an improved form of machine for ground treatment, which is economic to produce, relatively simple to operate and whose treatment tool can be readily angled and steered independently of a power unit for moving the machine when the machine is not self-driven.

According to the present invention there is provided a grading machine comprising a main bar, a grading blade, a vertical pivot connecting the grading blade with the main bar so that the blade is pivotable relative to the main bar about a vertical axis, a pair of spaced, short beams extending rearwardly of and closely adjacent to the blade and being connected with the back of the blade through the intermediary of a vertical pivot and a horizontal pivot, a wheel mounted on each beam closely behind the grading blade, means for turning each beam about its horizontal pivot so as to effect raising or lowering of the blade, and means for pivoting the grading blade about the vertical pivot irrespective of the position of the main bar whereby the grading blade can be angled without altering the direction of travel of the grading machine.

Preferably means are provided for steering the wheels.

The main bar is preferably a draw bar and may be adapted to be attached to a vehicle provided with a source of hydraulic power, and the grading blade is arranged to be pivoted, raised, lowered and steered by hydraulic means. Alternatively, the machine may be provided with its own source of power.

An embodiment of the present invention will now be described by way of example, with reference to the accompanying drawings, in which:

FIG. 1 is a plan view of a ground-grading machine according to the present invention, and FIG. 2 is a side elevation of the machine shown in FIG. 1.

The ground-grading machine has a hollow, elongate draw bar 1 having a towing link 2 at its forward end for connection to a tractor (not shown). Towards the rear end of the drawbar 1 is mounted a support beam 3 through the intermediary of a vertical pivot joint 4. The support beam 3 mounts a grading blade 5 under the draw bar 1. Intermediate the pivot 3 and each end of the blade 5 there is provided a vertical support pillar 6 attached to the rear of the blade 5. A vertical bar 7 is pivotally attached to each pillar 6 via a vertical pivot 8 cooperating with a horizontal arm 9 attached at one end to the top of each bar 7.

Each bar 7 has a rearwardly extending beam 10 attached adjacent the lower end of the bar 7 through a horizontal pivot 11. Intermediate the ends of each beam 10 there is provided a horizontal pivot point 12 to which is attached the piston arm 13 of a hydraulic piston 8 and cylinder device 14 whose cylinder is pivoted through a horizontal pivot 15 to the bar 7 at a location towards the top end of the bar 7. A wheel 16 is mounted on a stub axle 17 carried at the free end of the beam 10 beyond the pivot point 12.

Adjacent the top end of each pillar 6 the rear end of an elongate horizontal piston and cylinder device 18 is attached through a vertical pivot 40. The piston rod 19 of each device 18 is attached through a vertical pivot 20 to the draw bar 1 at a location intermediate the towing link 2 and the pivot joint 4.

The top end of the vertical pivot joint 4 also supports a lever 21 at one end thereof. The other end of the lever 21 has pivoted thereto two pairs of track rods 22 through a vertical pivot 23, there being one pair of track rods 22 extending laterally on either side of the lever 21. The outer ends of the two pairs of track rods 22 are connected to the free ends of the respective arms 9 through a vertical pivot 24.

A further hydraulic piston and cylinder device 25 is pivotally attached at one end to the lever 21 intermediate the ends thereof and at the other end to a plate 26 connected with the drawbar 1.

A scarifier indicated generally by the arrow 27 is located towards the forward end of the drawbar 1 and can be raised and lowered by operation of another piston and cylinder device 28.

The scarifier 27 is pivotally mounted on two pairs of upper and lower arms 41 and 42 respectively, pivotally mounted on a beam 43 depending from the main bar 1. A crossmember 44 connects the two lower arms 42 together and has pivotally connected thereto one end of the piston and cylinder device 28 whose other end is pivotally attached to the depending beam 43. Thus, operation of the piston and cylinder device 28 causes pivoting of the arms 41 and 42 about their connection with the beam 43 and raising or lowering of the scarifier 27 depending upon the direction of movement of the piston and cylinder device 28.

An operator's adjustable seat 29 is provided between the wheels 16 and a control panel 30 containing a 4 spool valve (not shown) provided with two control levers 31 is mounted in front of the seat 29 to control the operation of the hydraulic piston and cylinder devices 14, 18 and 25, the hydraulic piston and cylinder device 28 controlling the scarifier 27 being controlled by another control lever and valve (not shown).

The usual hydraulic pipe connections (not shown) are provided between the control panel and the piston and cylinder devices and further hydraulic pipes passing through or along the hollow draw bar 1 connect the valves to a conventional hydraulic fluid pump on the tractor.

In operation with the grading machine is connected up to the tractor, an operator on the tractor draws the grading machine behind the tractor across the ground to be graded. By appropriate operation of the control lever 31, he can raise or lower the grading blade 5 by effecting movement of the piston and cylinder devices 14 attached between the beams 10 and the bars 7 in order to remove the desired amount of material in the desired places. Extension of the piston and cylinder devices 14 causes the grading blade 5 to be lifted, whilst retraction of the piston and cylinder devices 14 cause the grading blade 5 to be lowered.

The effective width and angle of the grading blade 5 can be varied at will by operating the hydraulic piston and cylinder devices 18 attached between the draw bar 1 and the pillars 6 so that the grading blade 5 is angled to the desired extent. The track rods 22 and pivotal mounting of the bars 7 on the pillar 6 enable the wheels 16 to swivel relative to the blade 5 so that they are in correct alignment regardless of the direction and degree of angle of the blade 5 to which they are connected. The machine is so designed that the wheels are as near as possible to the back of the grading blade 5 and that regardless of the angle of the blade 5, the wheels 16 always lie behind the blade 5 in the path of the graded ground so that movement of the blade 5 due to one or both of the wheels 16 rolling over ungraded ground is avoided.

An angling of the blade 5 of as much as 40° on either side of the center position shown in FIG. 1 is possible.

The wheels 16 can be steered independently of the tractor by operation of the hydraulic piston and cylinder device 25 to angle the wheels as much as 25° on either side of their straight-ahead position.

The length of the drawbar and location of the wheels directly behind the blade serve to reduce any undesirable vertical movement of the blade due to the vertical movement of the tractor when travelling over the ungraded ground.

In a second embodiment (not shown) a machine for grading the surface of the ground has a hollow, elongate draw bar adapted for connection at one end to a tractor. Adjacent the other end of the draw bar is mounted a grading blade through the intermediary of a vertical pivot joint between the drawbar and the middle of a support frame carrying the grading blade under the drawbar. The frame extends along substantially the whole length of the grading blade and, at each end, is provided with a vertical pillar to which is pivotally attached a vertical bar. Each bar has a beam pivotally attached to the lower end thereof. The beam extends rearwardly of the grading blade which faces towards the tractor connectable end of the drawbar. A wheel mounted on a stub axle is carried by each beam. Between the top end of each bar and that part of its associated beam adjacent the stub axle is pivotally mounted a hydraulic piston and cylinder device for effecting vertical movement of the grading blade.

The end of the drawbar remote from the end connectable to the tractor pivotally mounts a pair of tie rods, each tie rod extending laterally on either side of the drawbar and being pivotally attached to the blade remote end of the beam on either side of the drawbar.

A pair of hydraulic piston and cylinder devices are pivoted to the drawbar and to either end of the grading blade frame. Hydraulic fluid supply lines from the tractor to the hydraulic piston and cylinder devices on the machine are led through or along the outside of the hollow drawbar, and valves are provided to control the devices in order to control pivoting, raising, lowering and steering movements of the blade.

If desired, by suitable location of the valves, for example, on a pivotal arm, the grading machine can be operated from the tractor seat or a seat provided behind the blade, either on the drawbar, or on the grading blade frame to one side of the drawbar. In the latter position, a less obstructed view of the ground to be graded is possible.

In a third embodiment of the grading machine (also not shown), the arrangement is similar to the second embodiment described hereinbefore except that the two separate tie rods pivoted between the drawbar and beams carrying the wheels are replaced by a single or split tie rod extending between and pivoted to the blade remote end of the two beams. A hydraulic ram may be connected from one or each beam to the frame at the rear of the blade. This arrangement is such that when the or each hydraulic ram is in its neutral position the wheels of the grading machine still automatically align themselves to the direction of travel, but if the or each hydraulic ram is extended or retracted the grading machine is caused to run to one side or other of the center line of the drawing vehicle. In this manner, it is possible to offset the grading machine by as much as 6 or 7 feet from the grading line and it is therefore possible for an operator of the grading machine to steer very accurately when grading adjacent walls, fences and corners. With the speed of the drawing suitably reduced, it is considered possible to grade right up to the site perimeter thereby virtually eliminating manual grading of the perimeter as is normally required.

It will be appreciated that the hydraulic piston and cylinder devices can be replaced by any equivalent devices, for instance, rack and fixed pinion devices and that, in the place of a tractor, any suitable vehicle may be employed to draw the grading machine. If desired, an animal may be employed in the place of a vehicle.

If desired, a machine according to the present invention may be self-propelled or propelled by a vehicle arranged to push the machine rather than draw it.

If the grading machine is to be self-propelled or drawn by a vehicle not having a suitable attachment for drawing the grading machine in a semimounted fashion as described above, a further pair of wheels and a suitably modified drawbar may be employed.

The devices for adjusting the vertical position and angle of the grading blade and the angling of the wheels may be operated manually or by a small prime mover on the grading machine, if desired. The manual operation may be effected mechanically or hydraulically using a manually operable pump.

If desired, the blade may be arranged to be tipped or tilted by rotation about a horizontal axis.

Instead of employing hydraulic rams to angle the tool support a pair of tie rods pivotally attached between the tool support and the forward end of the drawbar may be employed, each tie rod being arranged to be attached at any one of a number of spaced locations along the drawbar so that the desired angle of the tool support can be selected by selection of the appropriate locations at which to pivot the tie rods. Alternatively, a chain or cable attached to each end of the tool support and passing round a capstan or the like on the drawbar may be provided. The capstan or the like is rotatable by a drive operated by a handwheel located in front of an operator of the machine.

If desired, the machine may be ballasted by earth, sand or the like in a ballast box located on the machine behind the tool support, the ballast box being provided with a removable side or bottom to enable the ballast to be dumped when desired.

It will be manifest that a machine according to the present invention can be adapted for use in grading and seeding, in clearing snow or sand or in agricultural ploughing instead of surface grading.

We claim:

1. A grading machine comprising a grading blade, a main bar, a vertical pivot means connecting the main bar with the grading blade so that the grading blade is pivotable about a vertical axis relative to the main bar, means between the grading blade and the main bar for pivoting the grading blade about said vertical pivot means irrespective of the position of the main bar, a pair of spaced, short beams extending rearwardly of the grading blade on either side of the center thereof, vertical and horizontal pivot means connecting each of the spaced, short beams with the back of the grading blade, a wheel rotatably mounted on each short beam, each of said wheels being located closely behind the grading blade, and means disposed between each beam and the grading blade for turning each beam separately about its horizontal pivot means so as to effect raising and/or lowering of the grading blade.

2. The grading machine as claimed in claim 1, wherein means are provided between the main bar and said beams for steering the wheels.

3. The grading machine as claimed in claim 1, wherein said means for pivoting the grading blade includes fluid power means provided between the main bar and the grading blade.

4. The grading machine as claimed in claim 1, wherein each beam is attached to a bar by means of the horizontal pivot means of said vertical and horizontal pivot means, said bar being pivotally connected by means of the vertical pivot means of said vertical and horizontal pivot means to a support behind the blade.

5. The grading machine as claimed in claim 4, wherein the means for turning each beam comprise a piston and cylinder device pivotally attached at one end to the bar and at the other end to the beam associated with each wheel.

6. The grading machine as claimed in claim 4 wherein means are provided for steering the wheels, said means comprising a lever pivoted to the main bar, track rod means pivotally connecting the lever with each said bar and a piston and cylinder device connected to the lever and to a member fixed to the main bar and arranged to effect movement of the lever to steer the wheels.

7. The grading machine as claimed in claim 1, wherein the main bar is a drawbar whereby the machine can be drawn by a powered vehicle.

8. The grading machine as claimed in claim 3, wherein the means for angling the grading blade comprises a pair of piston and cylinder devices connected between the main bar and the grading blade.

9. The grading machine as claimed in claim 1, wherein a scarifier is attached to the main bar.